United States Patent [19]

Geais

[11] Patent Number: 4,709,639
[45] Date of Patent: Dec. 1, 1987

[54] RAILWAY SYSTEM UTILIZING A LINEAR MOTOR FOR PROPULSION OF TRAINS

[76] Inventor: Robert Geais, 10 rue Talma, Paris, 75016, France

[21] Appl. No.: 792,059

[22] Filed: Oct. 28, 1985

[30] Foreign Application Priority Data

Nov. 5, 1984 [FR] France .................... 84 16796

[51] Int. Cl.$^4$ .................................. B61B 13/12
[52] U.S. Cl. ............................. 104/292; 104/290
[58] Field of Search ............ 104/290, 292, 294, 287, 104/288; 105/3, 26 D, 62 B, 34 P, 34.2, 48.2, 48.3; 318/38, 135, 687; 310/12

[56] References Cited

U.S. PATENT DOCUMENTS

| | | | |
|---|---|---|---|
| 1,502,546 | 7/1924 | Buchli ........................ | 105/62 B |
| 2,865,306 | 12/1958 | Bock et al. ................. | 105/3 |
| 3,233,559 | 2/1966 | Smith et al. ................ | 104/290 X |
| 3,577,928 | 5/1971 | Victorri ...................... | 104/292 |
| 3,712,240 | 1/1973 | Donlon et al. ............. | 104/292 |
| 3,792,665 | 2/1974 | Nelson ....................... | 318/135 X |
| 3,877,387 | 4/1975 | Kasai et al. ................ | 104/290 X |
| 3,974,778 | 8/1976 | Black et al. ................ | 104/292 |
| 4,440,092 | 4/1984 | Sobolewski ................ | 105/49 X |
| 4,454,457 | 6/1984 | Nakamura et al. ........ | 104/292 X |

FOREIGN PATENT DOCUMENTS

| | | | |
|---|---|---|---|
| 2349568 | 4/1974 | Fed. Rep. of Germany ...... | 104/292 |
| 0027117 | 3/1979 | Japan ............................. | 104/290 |
| 0470319 | 8/1937 | United Kingdom ............. | 105/3 |

OTHER PUBLICATIONS

Nouvion, M., *Sciences et Vie*, "The Future of Locomotion", (pp. 58–63).

*Primary Examiner*—Randolph A. Reese
*Assistant Examiner*—Scott H. Werny
*Attorney, Agent, or Firm*—Rines and Rines, Shapiro and Shapiro

[57] ABSTRACT

A railway system utilizes a discontinuous linear motor for the propulsion of a train composed of a plurality of transport units joined end-to-end, each including a group of vehicles normally maintained coupled to each other. The transport units are of the same length L and carry secondary elements of the linear motor at regular intervals. A track for the train has active sections incorporating primary inductors of the motor and separated by inactive track sections having no primary elements. The primary inductors within an active track section are disposed at regular intervals L, from center to center. In the active track sections, the linear motor provides power to the train proportional to the number of transport units.

10 Claims, 2 Drawing Figures

RAILWAY SYSTEM UTILIZING A LINEAR MOTOR FOR PROPULSION OF TRAINS

BACKGROUND OF THE INVENTION

Progress in railway transportation, as in any other mode of transportation, is manifested definitively by increases in the quality of services offered (and in particular by increased operating speeds), and by reduction of unit costs of transportation (costs per standing, sitting or lying passenger space offered for passenger transport, or cost per ton or cubic meter in the case of transportation of merchandise), increases in usable load of trains being, among other things, an essential factor in these unit costs.

Research by the railway industry into more and more powerful propulsion systems has always been pursued actively, because these systems provide the means of increasing operating speeds and/or usable loads and are consequently a particularly effective means of railway progress.

It should be added that technical solutions adopted and developed for the implementation of increasingly powerful propulsion systems have naturally been utilized to construct systems of all power levels, improving their performance and reducing their cost. Thus, the improvement of performance and reduction of cost (per unit of power) of all propulsion systems have generally appeared as "fallout" from a search for maximum power, maximum speed and maximum usable load.

The reduction of cost of propulsion (per unit of power) has contributed in turn to railway progress, by adding its effects to those of increases in speed and/or increases in usable load.

Concerning the systematic utilization of the linear motor for railway propulsion, the following observations can be made:

1. Normally, the use of linear motors will result in new railway systems different from current systems using only classical propulsion systems.

2. There will be little effort toward the development of these new systems unless there is assurance that the cost will be sufficiently low that it will be recovered fairly rapidly as a result of improvement in the economy of railway operation.

3. It is from railway progress as defined above that such a result can be expected, and there is good reason to believe that today, as in the past, it will be the increase in propulsion power and reduction of its unit cost which will open the broadest pathway to railway progress.

4. In order for the linear motor to take its place in the panoply of railway propulsion systems, it must offer greater propulsion power levels than those attainable solely by utilization of the most modern classical systems. It is necessary in addition that these greater power levels be obtained at a lesser unit cost.

5. The fundamental advantage of the linear motor which enables such a result to be attained is that only the secondary of the motor need be maintained on the train; and the secondary can consist of simple, lightweight components, with very little bulk. This is an advantage of the same character as that which contributed to the success of electric locomotion, because it reduces the weight of propulsion equipment on board the train by allowing on-the-ground placement of energy generation equipment which autonomous locomotion would require on board the train. Moreover, it does not necessitate extensive and costly modifications of the forms and structures of vehicles.

6. A secondary advantage of linear-motor based railway systems resides in the fact that it will no longer be necessary to depend solely on wheel-to-rail adhesion to produce traction or braking forces.

To the present, the principal obstacle to the development of the linear motor for railway propulsion has resided in the fact that generally its utilization has been envisaged solely with a view to benefitting from this second advantage, without recognition that the first advantage alone could be determinative. Thus, for example, in an article published in the review "Sciences et Vie," under the title "The Future Of Locomotion," M. Nouvion does not even mention the linear motor in the chapter on increased power, while, in a different chapter dedicated to the linear motor, he refers only to the secondary advantage, and writes, "the advantage of this system is to be liberated from wheel-rail adhesion to produce traction or braking forces."

Summary Of the Invention

The present invention, concerning railway systems employing a linear motor for the propulsion of trains, combines to this end the following features in regard to implementation, line equipment, and the linear motor itself, and its original characteristics:

A. Carriers (passenger or freight) utilize groups of vehicles, normally inseparable (maintained coupled to one another), forming "transport units," all of the same length L. To constitute a train, a certain number n of these units are coupled, to form an assembly E of length nL.

The trains are either constituted solely of such an assembly E, or are complemented by classical vehicles (traction equipment or rolling stock) placed at the head or tail of the assembly E.

Each transport unit bears N identical elements S, constituting the secondary of a linear motor, all disposed in the same manner, in discontinuous and regular fashion.

The n×N elements S of an assembly E are spaced at a regular interval of $s_1 = L/N$ meters.

The elements S can be grouped by twos to constitute doublets, and in this case the pairs are regularly spaced at intervals of $s_2 = 2L/N$.

B. The linear motor functions in intermittent fashion, because sections of track equipped with inductors G, constituent elements of the primary of the linear motor, alternate with sections of track not equipped with such inductors. The former sections are termed "active," and the latter "inactive."

C. On each active track section, the elements G always have the same length, $s_1$ or $s_2$, or a multiple of $s_1$ or $s_2$.

The elements G are regularly spaced at an interval of L meters.

Thus, like the secondary, the primary structure is discontinuous and regular.

D. Under these conditions, from the moment the train enters an active section, until it begins to leave it, the linear motor furnishes a continuous power proportional to the number n, the number of transport units entering into the composition of the train.

E. Within one possible system, the transport units consist only of cars (exclusive of any classical motor elements, acting on certain axles).

Within this system, the problem of crossing the inactive track sections is solved in two ways:

E1. One or more locomotives are placed at the head or tail of the assembly E; their power is utilized not only in crossing of inactive sections, but also in crossings of active sections, this power being added to that of the linear motor during these crossings. The progress of the train is controlled solely by human or automated action on the locomotive or locomotives, with the linear motor entering automatically into action at the desired moment, either because it is constantly under voltage, or because it is placed under voltage by the approach of the train.

E2. In the case of relatively short inactive sections, or on a grade, the crossing of these sections is carried out by momentum. The progress of the train is controlled by action on the elements G constituting the primary of the linear motor.

F. Within a second possible system, classical motor elements, acting on certain axles, enter into the composition of certain transport units, termed self-propelling units. In this case, the progress of the train, as in the case E1, is regulated by action (human or automatic) on these motor elements which are utilized for propulsion all along the track, with their power being added to that of the linear motor, when crossing active sections.

The elements S constituting the secondary of the linear motor can be simply metallic plates each borne by at least two axles of the train. The lower face of each plate is a short distance from the upper face of the inductors of the linear motor disposed on the ground between the pairs of linear rails.

The axles of any transport unit all bear boxes, whether locomotive boxes, passenger car boxes, or freight car boxes. Some can be motors, others not; some can bear plates S, others not. Thus a train can have four types of axles, all of course bearing boxes:

C-type axles bearing boxes only, M-type bearing motors, P-type bearing plates S, and MP-type axles, bearing both a motor and a plate S.

BRIEF DESCRIPTION OF THE DRAWING

The appended drawing shows schematically by way of example two modes of realization of the present invention.

DESCRIPTION OF THE PREFERRED EMBODIMENTS

In each figure, the transport units comprise motor elements acting on certain axles.

Figure 1:
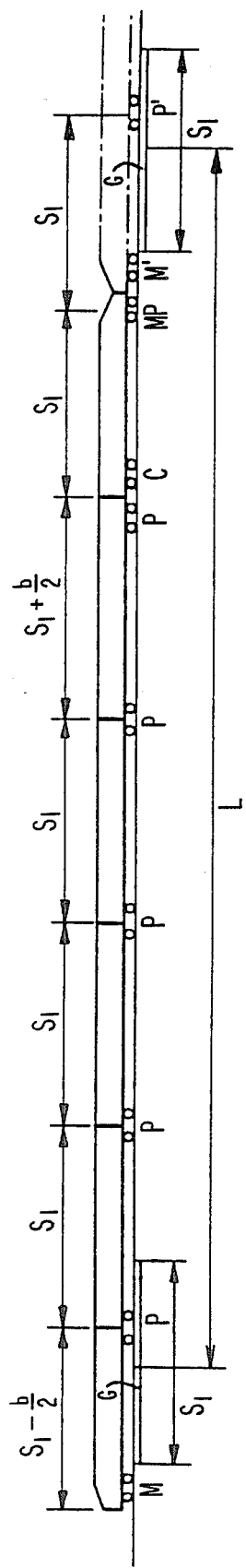
FIGS. 1 and 2 shows two different arrangements of transport units and of trains.

The transport unit shown in FIG. 1 comprises six boxes, borne by eight trucks with two axles each. From right to left, the first truck is an MP truck, the second a C truck, the next five P trucks, and the eighth an M truck. The number N of plates S is six; the length of the 1st, 3rd, 4th and 5th boxes is $s_1$, as is the spacing distance between the plates S. The length of the second box is $s_1+b/2$, and that of the sixth is $s_1-b/2$, where b is the length of a truck.

The figure shows two inductors G of length $s_1$, the distance between center lines of which is L.

If two such transport units are paired, there is constituted a train bearing 2N or 12 plates, with the distance between axes separating the last truck P' of the new string, assumed to be placed at the head of the train, from the first truck MP of the base string, being $s_1$. The force exerted on the train thus constituted is twice that exerted on each of the units of which it is composed. In a general way, the power of the linear motor varies in proportion to the number of transport units entering into the composition of the train.

Figure 2:
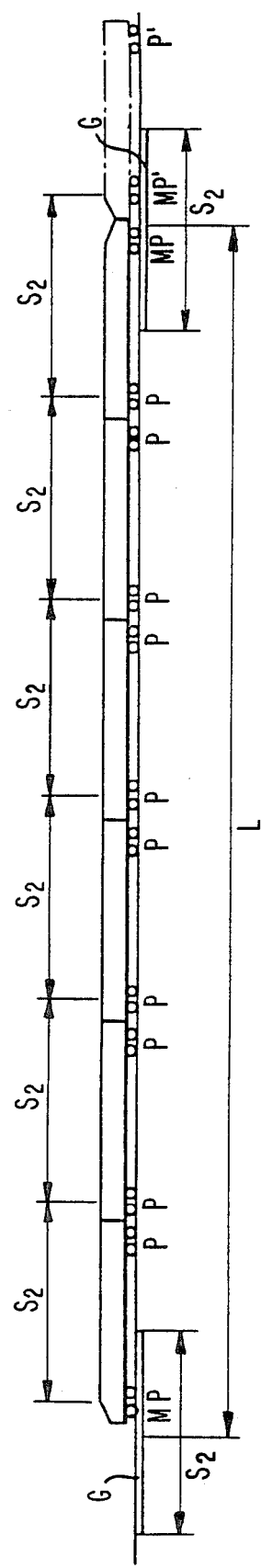

The transport unit shown in FIG. 2 also comprises six boxes, each borne by two trucks with two axles. The total number of plates is twelve; they form six pairs at a spacing of $s_2$. The first and last trucks are MP trucks, and the rest are P trucks.

The figure shows two inductors G of length $s_2$, the separation between centers of which is L.

If two such transport units are combined, the last truck MP' of the transport unit placed at the head and the first truck MP of the second transport unit form a pair, with the train formed by the two transport units comprising 24 trucks forming twelve pairs regularly spaced at an interval of $s_2$.

The new railway system and the linear motor which it utilizes find use when it is desired to employ a propulsion power greater than can be employed in the case of a classical system, regardless of the progress which may be made in the future with respect to classical propulsion, and/or when it is desired to obtain a greater economy of operation within a classical system.

The new system can be utilized to improve operation of lines of an existing rail network, or in the case of construction of a new line.

The new system can be utilized in the case of general purpose railways, and in the case of urban rail systems.

I claim:

1. A railway system employing a discontinuous linear motor for train propulsion, comprising a train assembly formed with a plurality of transport units each including a group of vehicles ordinarily maintained coupled to one another, the transport units being joined end-to-end and all being of the same length L meters, the transport units also carrying secondary elements of said linear motor disposed at regular intervals such that the secondary of said linear motor is discontinuous, a track for operation of said train assembly thereon, said track having spaced active sections each equipped with a group of inductors which are disposed at regular intervals of L meters from center line to center line within each active section, the groups of inductors of said active sections constituting the primary of said linear motor and said active sections being separated from one another by inactive track sections having no primary inductors of said linear motor, such that during operation said train assembly will alternately occupy active and inactive sections of said track and thereby receive a propulsive force from said linear motor intermittently as said train assembly alternately passes through the active and inactive track section.

2. A railway system according to claim 1, wherein each transport unit bears the same number N of secondary elements, which elements are in the form of metallic plates attached to selected axle groups of each transport unit.

3. A railway system according to claim 2, wherein the secondary elements carried by the transport units are regularly disposed at intervals of length $s_1=L/N$ meters.

4. A railway system according to claim 3, wherein each inductor has a length equal to a multiple of $s_1$.

5. A railway system according to claim 2, wherein the secondary elements are grouped in twos to form pairs of secondary elements, said pairs being regularly disposed at intervals of lengths $s_2 = 2L/N$ meters.

6. A railway system according to claim 5, wherein each inductor has a length equal to a multiple of $s_2$.

7. A railway system according to claim 1, including means for initiating automatic activation of the linear motor when said train assembly enters an active track section.

8. A railway system according to claim 1, wherein the transport units are constituted solely by vehicles having no on-board motor for propelling the vehicles.

9. A railway system according to claim 1, wherein the train assembly has a self-contained locomotive coupled thereto at at least one end of the assembly.

10. A railway system according to claim 1, wherein at least one of said transport units includes one or more on-board motors acting on selected axles of the transport unit.

* * * * *